United States Patent [19]
Molina

[11] Patent Number: 5,815,988
[45] Date of Patent: Oct. 6, 1998

[54] EXPANDABLE RETRACTABLE PORTABLE STRUCTURE

[76] Inventor: Jose Ramon Molina, 1131 S. A St., Santa Rosa, Calif. 95404

[21] Appl. No.: 772,936

[22] Filed: Dec. 24, 1996

Related U.S. Application Data

[63] Continuation-in-part of Ser. No. 662,530, Jun. 13, 1996, abandoned.

[51] Int. Cl.⁶ ............................... E04B 1/346; E04B 7/16
[52] U.S. Cl. .................. 52/67; 52/66; 52/68; 52/79.5; 52/91.3; 52/394; 52/395; 52/464
[58] Field of Search .................. 52/67, 68, 79.5, 52/91.3, 394, 795, 464, 741.4, DIG. 17, DIG. 15, 66

[56] References Cited

U.S. PATENT DOCUMENTS

| | | | |
|---|---|---|---|
| 3,107,116 | 10/1963 | Meaker | 52/67 |
| 4,546,578 | 10/1985 | Behrmann | 52/67 |
| 4,603,518 | 8/1986 | Fennes | 52/79.5 X |
| 4,726,158 | 2/1988 | Fagnoni | 52/68 X |
| 5,586,802 | 12/1996 | Dewald, Jr. et al. | 52/67 X |
| 5,658,032 | 8/1997 | Gardner | 52/67 X |

Primary Examiner—Christopher Kent
Assistant Examiner—W. Glenn Edwards
Attorney, Agent, or Firm—Bruce H. Johnsonbaugh

[57] ABSTRACT

An expandable retractable portable structure having a movable portion hingedly connected to a stationary portion and wherein the movable portion pivotally encloses the stationary portion of the structure in its retracted position and wherein, in its expanded position, the structure provides maximum interior space for use. An actuating mechanism includes one or more hydraulic or pneumatic cylinders connected to a linkage system. The actuator is located inside the structure on the floor of the stationary portion and the linkage system driven by the actuator is connected to the floor of the movable portion so that the movable portion is rotated by the actuator and linkage system between its expanded and retracted positions. The actuator and linkage system are removably mounted inside the structure and may be readily removed from the structure and used to open or close other structures. Alternatively, the actuator may be left inside the structure.

10 Claims, 6 Drawing Sheets

EXPANDABLE RETRACTABLE PORTABLE STRUCTURE

CROSS REFERENCE TO RELATED APPLICATION

This is a continuation-in-part of application Ser. No. 08/662,530 filed Jun. 13, 1996, now abandoned, and entitled "Hydraulically Actuated Expandable Retractable Portable Structure."

BACKGROUND AND BRIEF SUMMARY OF THE INVENTION

This invention relates generally to expandable retractable portable structures. More particularly, the invention relates in part to a removable hydraulic or pneumatic actuating system for expanding and retracting the structure, and wherein the actuating system is mounted inside the structure. Single or multiple actuating systems may be used in accordance with the present invention.

The structure of the present invention can be used in trailers, motorized vehicles and also without a chassis in containerized form. When used without a chassis, the structure can be moved by lifting cranes and flatbed trucks under international shipping standards. The structure is capable of being built in multiple sizes, but preferably it is built of a size which is compatible with use as a containerized form or a size which permits being transported or utilized on public highways.

The prior art includes the expandable retractable structure of U.S. Pat. No. 5,265,394 dated Nov. 30, 1993. However, as pointed out in application Ser. No. 08/662,530, the '394 prior art patent teaches a structure utilizing a relatively complex cable and winch system for expanding and retracting the structure. That design poses the inherent risk that, if the cable breaks or becomes disconnected, the movable portion would fall, potentially injuring or killing workmen and damaging the structure. It is therefore desirable that a reliable and inherently safe actuation mechanism be provided for such expandable and retractable structures.

According to the present invention, the actuation system includes one or more removable hydraulic or pneumatic cylinders mounted inside the structure. Thus, for example, where multiple structures are brought into an emergency situation, such as the aftermath of an earthquake, a large number of structures can be opened or expanded utilizing the minimum possible number of actuating mechanisms. This feature reduces the overall cost of utilizing a plurality of structures as well as somewhat reducing the expense of shipping that group of structures.

A primary object of the present invention is to provide an expandable retractable portable structure having a removable actuation mechanism.

A further object of the invention is to provide an expandable retractable portable structure having either a hydraulic or pneumatic actuation mechanism mounted inside the structure.

A further object of the invention is to provide an expandable and retractable portable structure utilizing preferably a plurality of low friction roof slides along which the movable roof portion runs during the expansion and/or retraction operations.

Another object of the invention is to provide an improved roof seal joint for sealing the roof structure readily.

A further object of the invention is to provide an improved wall seal joint which readily seals the walls after the unit has been expanded.

Other objects and advantages will become apparent from the following description and the drawings wherein:

BRIEF DESCRIPTIONS OF THE DRAWINGS

DETAILED DESCRIPTION OF THE DRAWINGS

Figure 1:
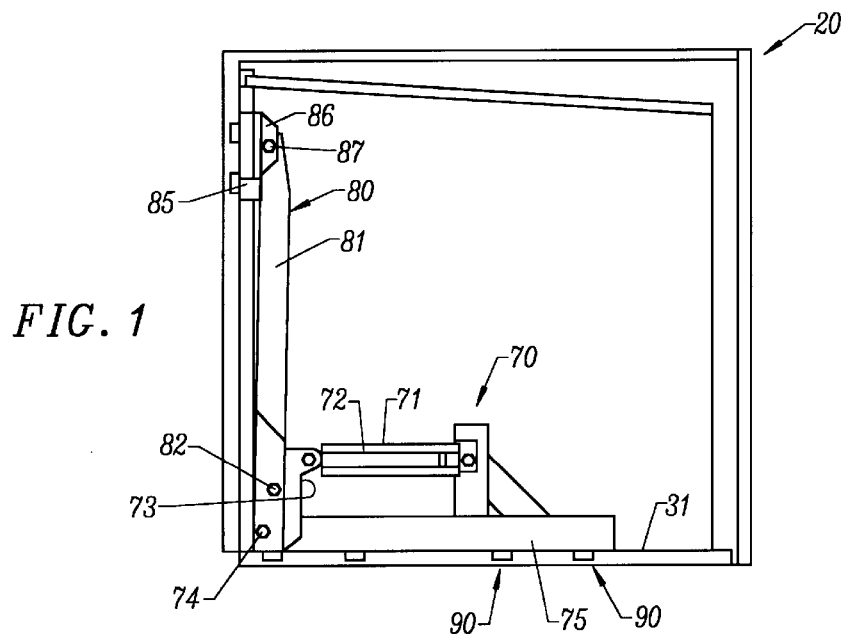
FIG. 1 is an elevational view, partially in section, showing schematically the structure of the present invention in its retracted position with the hydraulic actuation means and linkage inside the structure.
Figure 2:
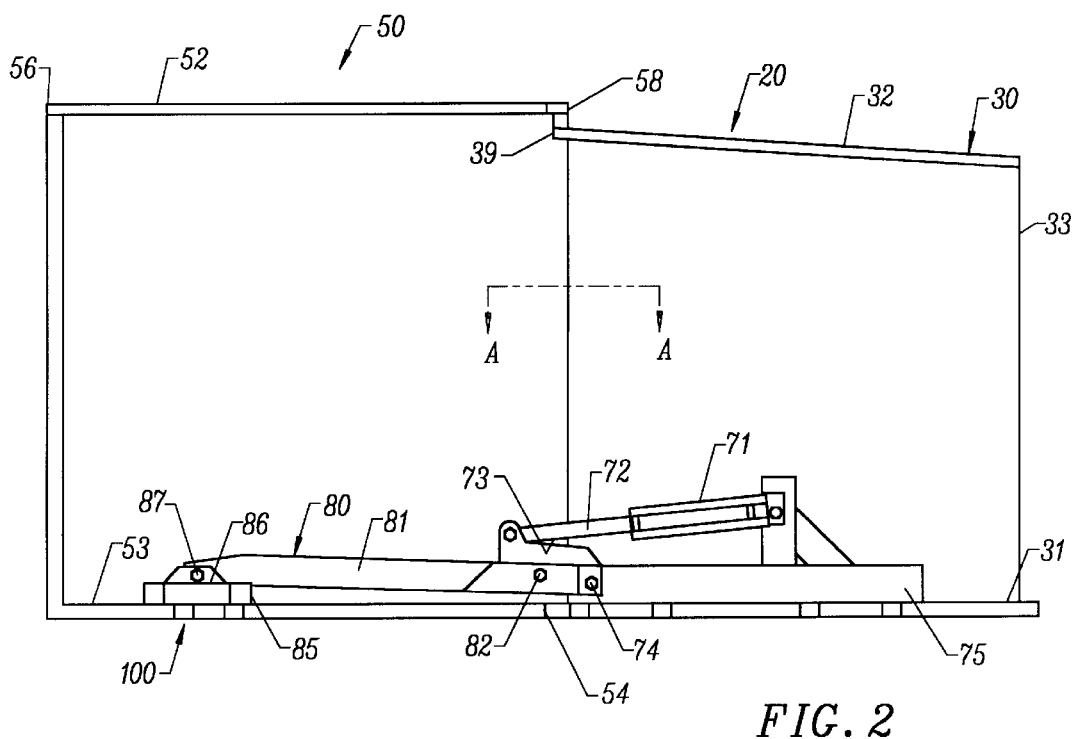
FIG. 2 is an elevational view, partially in section, showing schematically the structure of FIG. 1 in its expanded position, with the removable actuation and linkage mechanism still inside the structure.

FIG. 1 shows the expandable, retractable portable structure shown generally as 20 in its retracted position and FIG. 2 shows the structure 20 of the present invention in its fully expanded position. The structure has a stationary portion 30 with a fixed floor 31, a roof 32, an exterior sidewall 33, and front and rear walls that are not shown in FIGS. 1 and 2. The structure shown in the drawings is a portable structure without a chassis. It is to be understood that the structure can be mounted on a chassis as shown in application Ser. No. 08/662,530 or, alternatively, the structure can be utilized as a self-propelled vehicle such as a motor home.

The structure shown in FIGS. 1 and 2 is preferably made of a standard size to be capable of being handled by lifting cranes and flatbed trucks under international shipping standards. For example, without limiting the size of the structure, it may be 20 feet or 40 feet long (or shorter than 20 feet or longer than 40 feet) and capable of being shipped as a standard size container.

The structure also includes a movable portion shown generally as 50 having a movable floor 53, having an inner edge 54 which is hingedly connected to the floor 31 of stationary portion 30. The roof 52 of movable portion 50 is hinged at its outer edge 56 so that the movable portion may pivotally enclose the stationary portion 30 when it moves to its retracted position as shown best in FIGS. 7 and 8. The specification of application Ser. No. 08/662,530 is incorporated herein by reference. As described in application Ser. No. 08/662,530, movable roof 52 in its retracted position is generally vertical and is resistant to weather and vandalism.

The actuation means of FIGS. 1 and 2 is shown generally as 70 and includes a hydraulic cylinder 71 having a piston 72 connected to a pivot arm 73. It is to be understood that the actuation means 70 can be of any type capable of operating pivot arm 73. For example, without limitation, actuation means includes one or more hydraulic and/or pneumatic cylinders and the preferred embodiment is shown utilizing hydraulic cylinders. The actuation means could be an electrically driven gear train or other type actuators. Pivot arm 73 rotates about pivot point 74 which is carried by base member 75. Base member 75 is removably attached to the floor 31 of stationary portion 30 by a first connecting means 90 described in greater detail below. Linkage means shown generally as 80 includes a linkage arm 81 which is connected to pivot arm 73 by installing a pin 82 through linkage arm 81 and through pivot arm 73.

As shown in FIG. 1, hydraulic cylinder 71 has been driven to a position where piston rod 72 is fully withdrawn into the cylinder 71. In the embodiment shown in FIGS. 1 and 2, in this position of the hydraulic cylinder and its piston rod, linkage arm 81 is in a vertical position and the structure is in its retracted position as shown in FIG. 1. As shown in FIG. 2, hydraulic cylinder 71 has been driven to a position where piston rod 72 is fully extended from cylinder 71 which causes linkage arm 81 to rotate counterclockwise to the expanded position shown in FIG. 2 wherein linkage arm 81 is in a horizontal position, having rotated through approximately 90°.

Linkage means 80 includes a track 85 which is removably connected to the floor 53 of the movable portion 50 by second connecting means 100. The linkage means 80 also includes a slide 86 pivotally carried by the end of linkage arm 81 by a pin 87 extending through linkage arm 81 and slide 86. In the preferred embodiment, the surfaces of the track 85 and the slide 86, which move against each other, are coated with teflon or other similar materials having a low coefficient of friction. The slide 86 moves relative to track 85 during the retraction and expansion operations.

Figure 3:
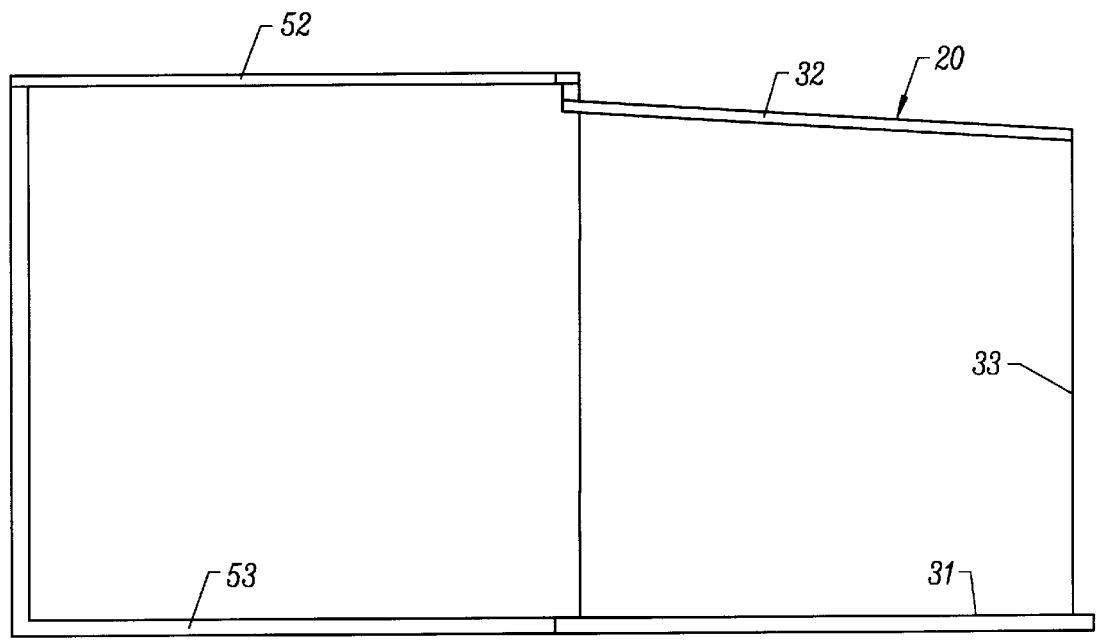
FIG. 3 is an elevational view in section showing schematically the structure of the present invention in its expanded position with the actuation and linkage means removed from the structure.
Figure 4:
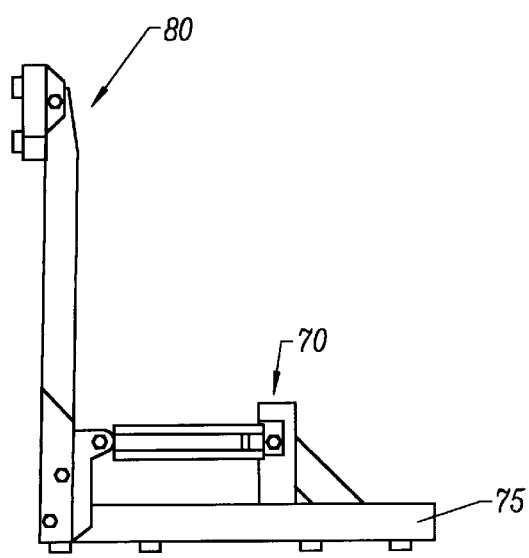
FIG. 4 is an elevational view of the actuation and linkage means that has been removed from the structure.

Referring to FIGS. 3 and 4, the actuation means 70 and linkage means 80 having been removed as a single unit from the expandable and retractable structure 20 and the structure 20 is in its fully expanded position. It is to be understood that the actuation means 70 and linkage means 80 can be placed back inside the structure 20 and utilized to retract the structure 20 so that it may be transported. Alternatively, actuation means 70 may be permanently stored inside the structure, in which case linkage means 80 is disconnected from movable floor 53 and raised to a vertical position for storage inside stationary portion 30. The advantage of utilizing a removable actuation means 70 and removable linkage means 80 minimizes the overall cost of delivering multiple units and expanding those units to their fully expanded position as shown in FIG. 3. A further advantage is that the removable actuation means and linkage means reduces the overall shipping weight and related shipping expenses due to the reduced tonnage.

It is also possible to utilize, for example, two hydraulic cylinders and two linkage systems to expand a single structure. Larger structures may be expanded by three or more cylinders and linkage systems. Furthermore, a single hydraulic or pneumatic cylinder may be connected to two or more linkage means and those multiple linkage arms driven simultaneously.

Figure 5:
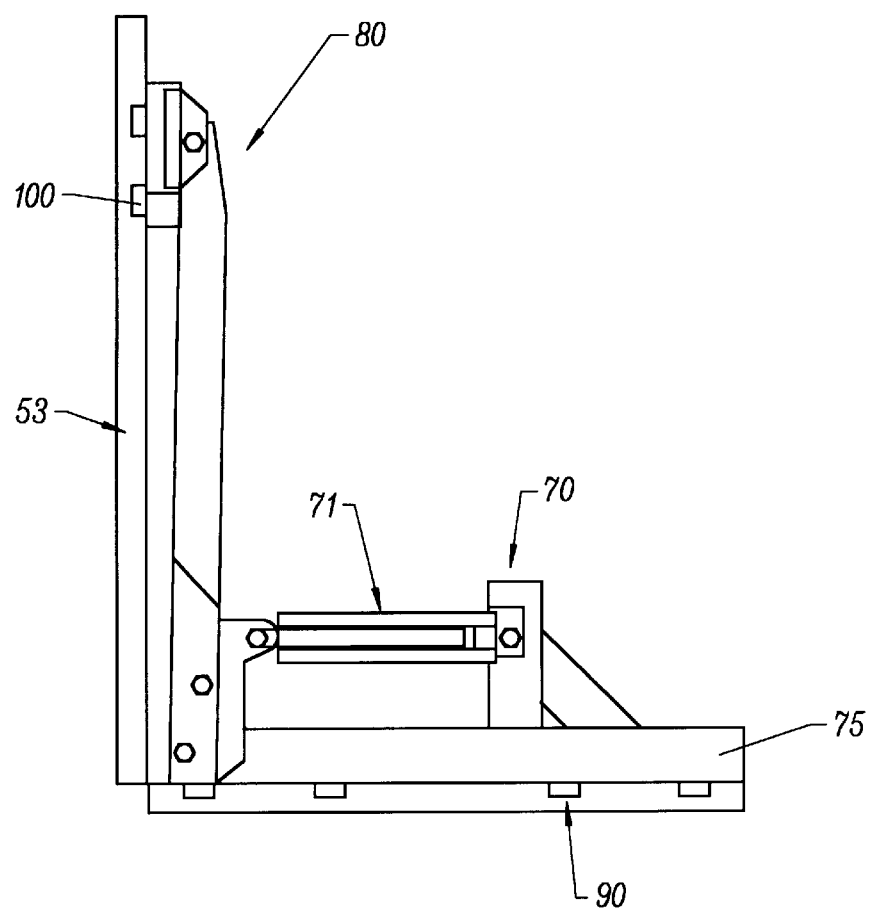
FIG. 5 is an elevational view showing the actuation and linkage means and its manner of attachment to the stationary floor and the movable floor.
Figure 6A:
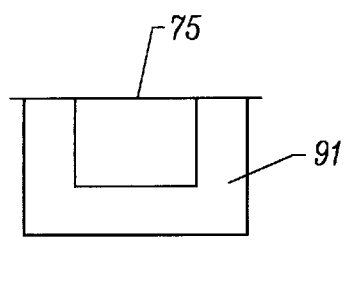
FIGS. 6A and 6B are schematic representations of the connecting means between the actuator and the floor of the structure.
Figure 6B:
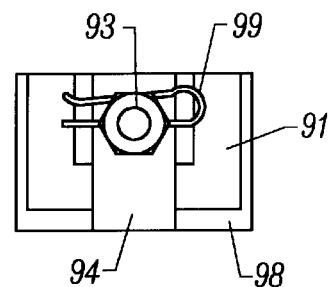

Referring to FIGS. 5, 6A and 6B, the first connecting means 90 and second connecting means 100 are shown in greater detail. In the embodiment shown in FIG. 5, the first and second connecting means 90 and 100, respectively, are identical. In the embodiment shown, first connecting means 90 includes generally square shaped metal lugs 91 carried by frame 75 and which is placed into a square shaped recess 98 formed in the floor 31 of stationary portion 30. A vertical member 94 carried by recess 98 carries a removable pin 93 and cotter key 99. Lugs 91 extend downwardly into the square recess 98 and connected firmly to square recess 98 by pin 93 and cotter key 99.

Figure 7:
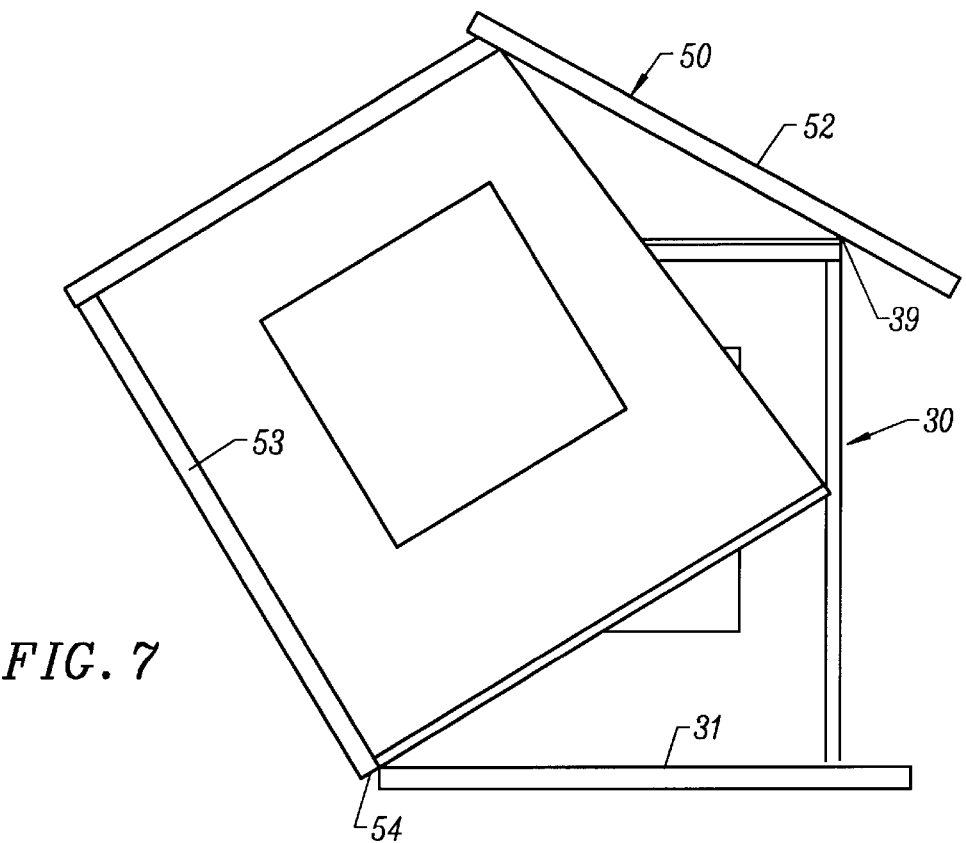
FIG. 7 is a schematic elevational view showing schematically the structure in an intermediate position as it is being expanded.
Figure 8:
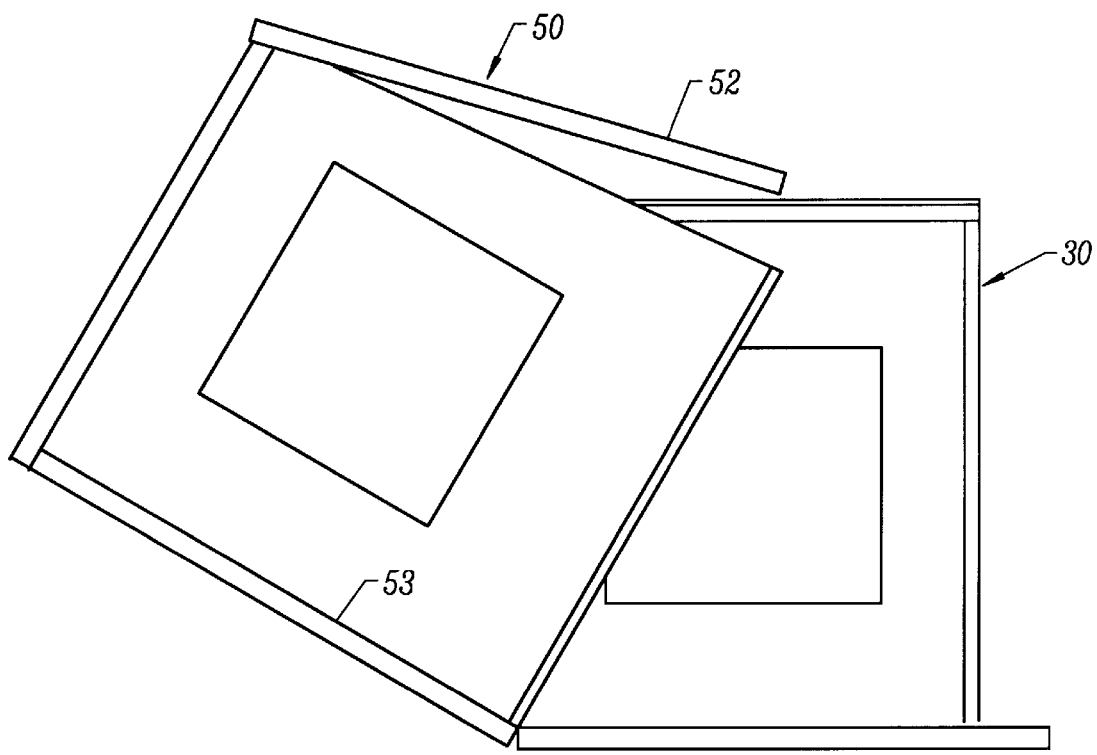
FIG. 8 is a schematic elevational view showing schematically the structure as it is being further opened and nearly to its expanded position.

FIGS. 7 and 8 are schematic representations showing the relative positioning of the stationary portion 30 and the movable portion 50 of the structure in the intermediate phase of either expanding or retracting the structure. FIGS. 7 and 8 show the pivoting motion of the movable section 50 about the hinged inner edge 54 of floor 53 and also show how the roof 52 is hinged to allow the movable section to pivotally enclose the stationary portion 30 in the retracted position of the structure.

Figure 9:
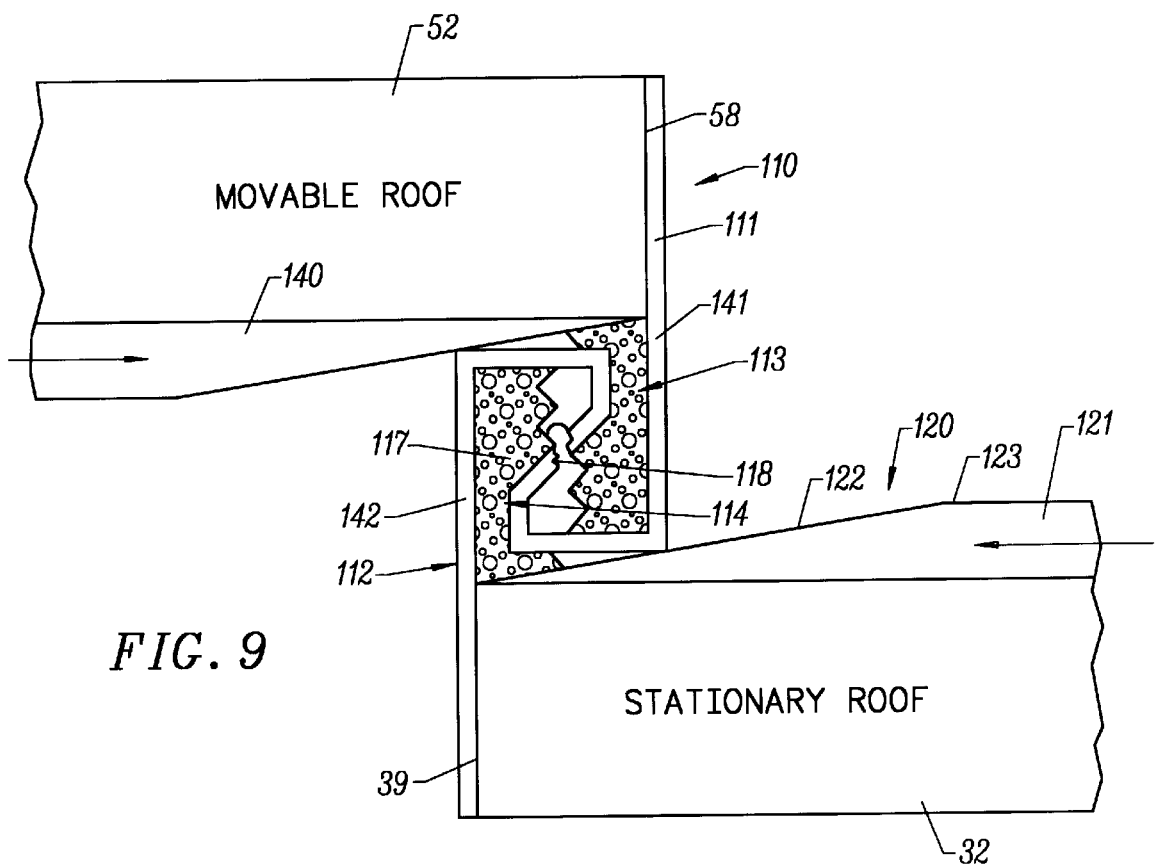
FIG. 9 is a schematic elevational view of the roof closure means according to the present invention.

FIG. 9 is a schematic representation of the roof closure means 110 of the present invention. Roof closure means 110 includes a pair of opposed generally J-shaped sections formed on the inner edge 58 of movable roof 52 and on the inner edge 39 of stationary roof 32. These J-shaped sections are preferably aluminum or powder coated steel. Each of the opposed sections 111 and 112 carries a resilient insulating and sealing material 113 and 114, respectively, which seal against each other when the structure 20 is in its fully expanded position as shown in FIGS. 2 and 9.

FIG. 9 also shows roof slide means 120 carried by the roof 32 of the stationary portion 30 of the structure. The roof slide means comprises a nylon strip 121 having an inclined end 122 which inclines upwardly away from the inner edge 39 of stationary roof 32 and a flat portion 123 which extends across the width of stationary roof and carries the weight of the movable roof 52 during a portion of the expansion or retraction operations. During the expansion and retraction operations, J-shaped section 111 slides across roof slide means 120.

As shown in FIG. 9, the inner tips 117 and 118 of J-shaped sections 111 and 112, respectively, are spaced apart from one another to avoid any interference between those tips in the closed position. The resilient sealing material 113 and 114 along the shanks 141 and 142 of the J-shaped sections 111 and 112, respectively, forms the actual seal. The resilient sealing material 113 and 114 forms a full and complete seal when the structure is in its fully expanded position shown in FIG. 9. The opposed and interlocking J-sections also are inherently wind resistant.

Figure 10:
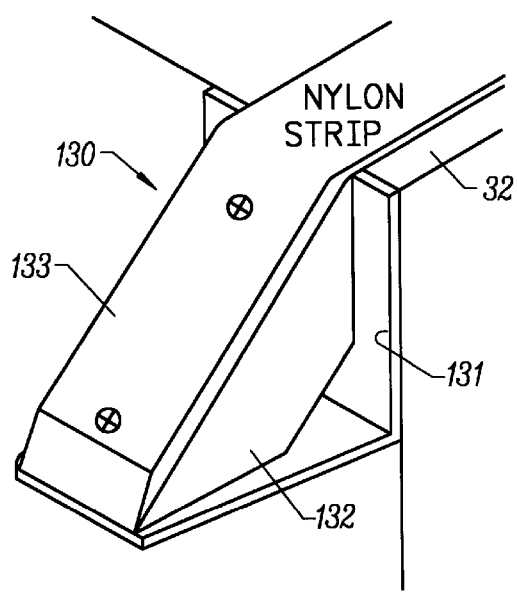
FIG. 10 is a perspective view of the roof guide block mechanism according to the present invention.

FIG. 10 shows an inclined guide block which is applied to the outermost edge of the stationary roof 32. The guide block 130 is carried by an aluminum L-bracket which supports an aluminum trapezoidal support member 132, the surface of which carries a nylon strip 133. Guide block 130 guides the movable roof over the exterior of stationary portion 30 and the movable roof 52 has a series of movable roof slides 140 mounted on its lower surface as shown best in FIG. 9. These movable roof slides slide against the guide blocks 130 once the J-shaped section 111 has gone past the extreme outermost corner 39 of the stationary section, as shown generally in FIG. 7.

Figure 11:
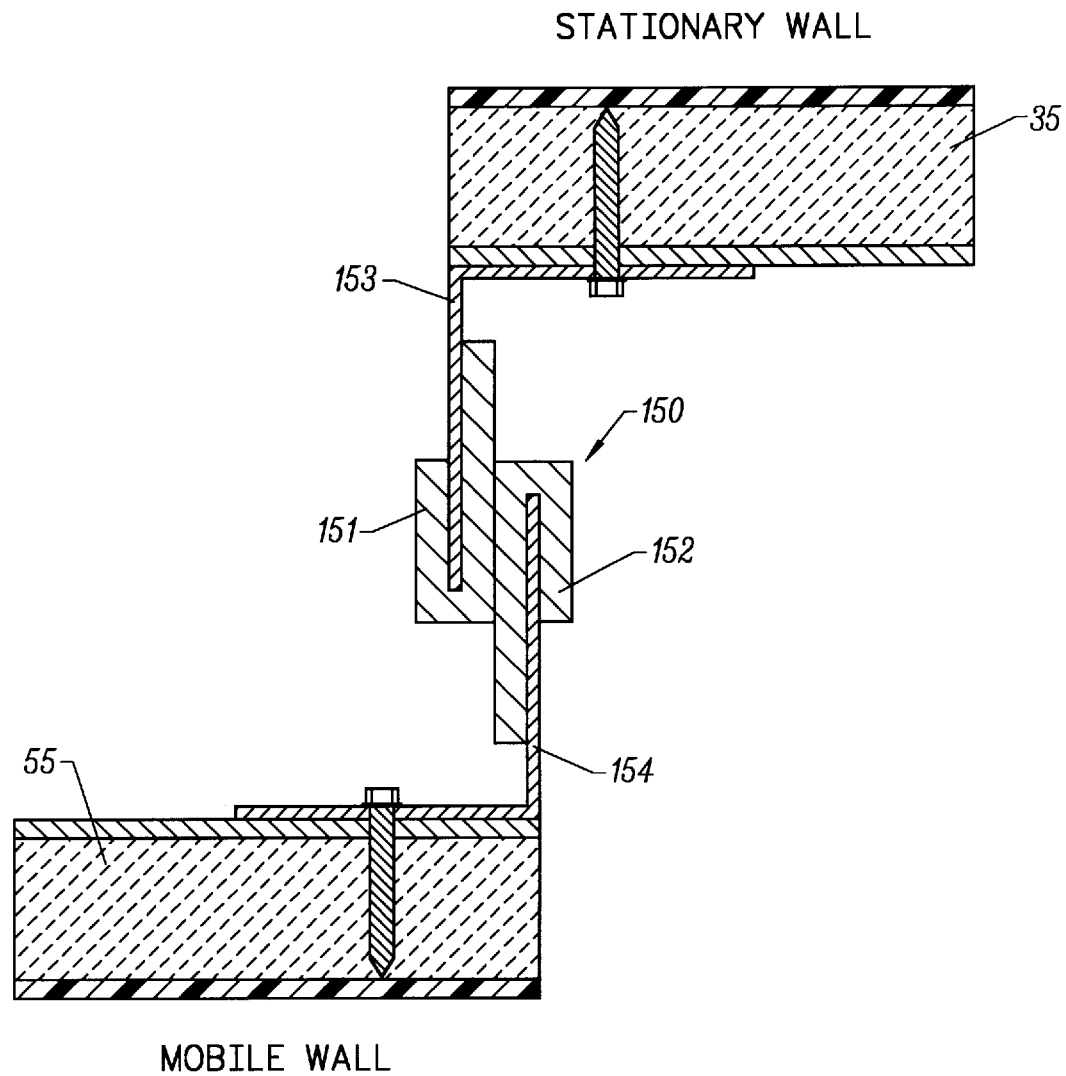
FIG. 11 is a plan view in section of the wall sealing mechanism according to the present invention.

FIG. 11 is a sectional view on the line A—A of FIG. 2 and shows a wall sealing means generally as 150. The purpose of the wall sealing means 150 is to provide a seal at the inner edges of the stationary and mobile walls when the structure is in its fully expanded position shown in FIG. 2. The wall sealing means 150 comprises a pair of strips of rubberized insulation 151 and 152 which are carried, respectfully, by a pair of L-brackets 153 and 154, respectively, which in turn are carried by the edge of stationary wall 35 and the edge of mobile wall 55.

What is claimed is:

1. An expandable retractable portable structure having a retracted configuration to facilitate the structure being transported, and an expanded configuration wherein maximum interior space is available for use, comprising:

a stationary portion having a fixed floor, roof and walls, a movable portion having a floor, roof and walls, said movable portion pivotally enclosing said stationary portion in the retracted configuration of the structure, said floor of the movable portion having an inner edge and an outer edge, said roof of said movable portion being hingedly connected to the top of one wall of said movable portion, said roof forming an outer wall of said structure in its retracted position, said outer wall being resistant to weather and vandalism, said movable roof moving together with and simultaneously with said movable walls, said movable roof and movable walls pivoting simultaneously approximately 90° between said retracted and expanded configurations, hinge means connected to said inner edge of the floor of said movable portion, hydraulic or pneumatic cylinder actuation means mounted inside said stationary portion and connected to the floor of said stationary portion, and linkage means connected to the floor of said movable portion and responsive to said actuation means for rotating said movable portion about said hinge means between said retracted and expanded configurations without the use of any cables or pulleys.

2. The apparatus of claim 1 further comprising first connecting means for removably connecting said actuation means to the floor of said stationary portion, and second connecting means for removably connecting said linkage means to the floor of said movable section.

3. The apparatus of claim 2 wherein said first and second connecting means comprise one or more recesses formed in the floors of said stationary and movable portions.

4. The apparatus of claim 1 wherein said actuation means comprises a hydraulic cylinder and a pivot arm connected to said hydraulic cylinder.

5. The apparatus of claim 4 wherein said linkage means comprises a track removably carried by the floor of said movable portion and a slide adapted to move on said track, said slide being connected through a linkage arm to said pivot arm.

6. The apparatus of claim 5 further comprising slide means mounted on said stationary portion adapted to carry the roof of said movable portion through a part of its travel as said movable portion is driven between its expanded and retracted positions.

7. The apparatus of claim 6 further comprising an inclined slide means carried by the inner edge of the movable roof to carry said movable roof through a part of its travel as it expands and retracts.

8. The apparatus of claim 7 further comprising roof closure means which includes a pair of opposed, generally J-shaped sections formed on the inner edges of the movable roof and stationary roof.

9. The apparatus of claim 8 wherein said roof closure means further comprises resilient sealing means carried by each of said opposed generally J-shaped sections.

10. The apparatus of claim 1 wherein said actuation means comprises a pneumatic cylinder and a pivot arm connected to said pneumatic cylinder.

* * * * *